United States Patent [19]

Jaggers

[11] 3,861,268
[45] Jan. 21, 1975

[54] BLIND HOLE BOLT
[75] Inventor: Edward C. Jaggers, Louisville, Ky.
[73] Assignee: Jaggers Equipment Company Inc., Louisville, Ky.
[22] Filed: June 6, 1972
[21] Appl. No.: 260,329

[52] U.S. Cl. .............................................. 85/3 R
[51] Int. Cl. ............................................ F16b 21/00
[58] Field of Search .................................... 85/3 R

[56] References Cited
UNITED STATES PATENTS

| | | | |
|---|---|---|---|
| 1,075,759 | 10/1913 | Burridge | 85/3 R |
| 1,404,914 | 1/1922 | Van Winkle | 85/3 R |
| 2,578,515 | 12/1951 | Crafton | 85/3 R |
| 2,908,196 | 10/1959 | Apfelzweig | 85/3 R |
| 3,521,519 | 7/1970 | Chester | 85/3 R |

Primary Examiner—Edward C. Allen
Attorney, Agent, or Firm—William R. Price

[57] ABSTRACT

Discloses a blind hole bolt for use in areas where it is necessary to provide a strong anchoring connection requiring a tight fit and in which one side of the blind hole is inaccessible. The bolt comprises a shaft threaded at one end and contain a slot at the other end in which a flat locking blade is fitted. The flat blade contains a circular embossed pivot point and guide ball slidably mounted in a guiding channel contained in the slot. The embossed pivot point and guide ball allows the flat blade to pivot between a first position axially aligned with the shaft of the bolt to a second locked position generally transversely disposed relative to the shaft and for axial movement within the slot in moving between the two positions. A welded locking blade stop is provided at the end of the slot so that the blade when in locked position is in abutment with the stop which provides strength to the anchoring bolt.

3 Claims, 10 Drawing Figures

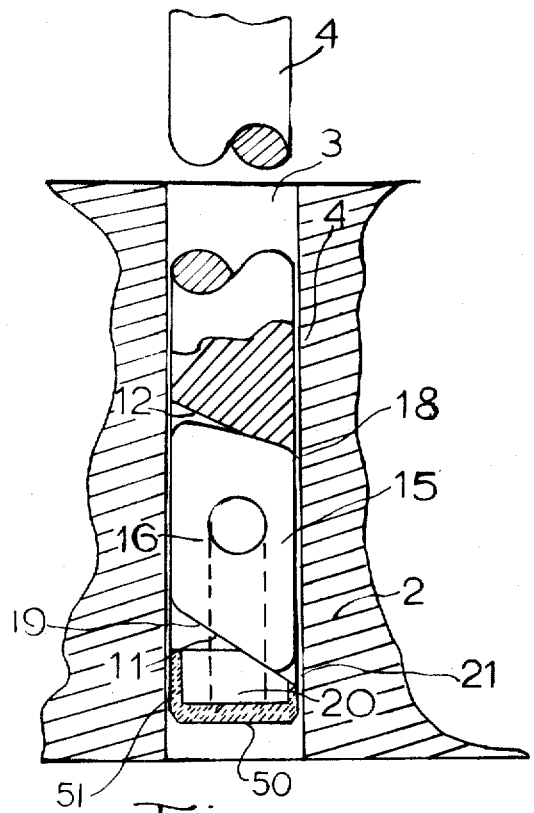
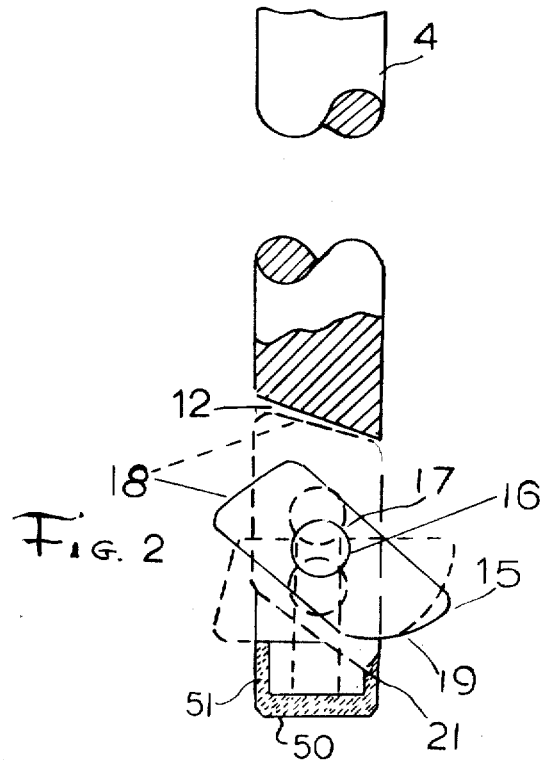
Fig. 1
Fig. 2
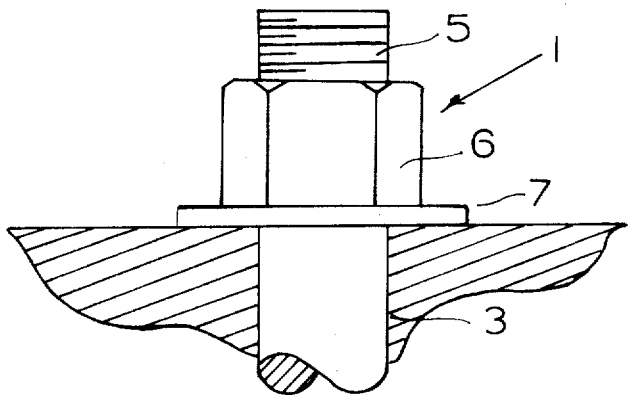
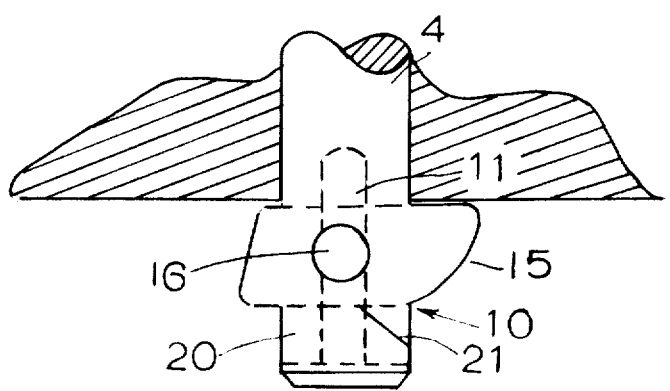
Fig. 3

PATENTED JAN 21 1975　3,861,268

BLIND HOLE BOLT

BACKGROUND OF THE INVENTION

This invention relates to a blind hole bolt and more particularly to a blind hole bolt containing a blade axially aligned with the shaft of the bolt when in inoperative position but pivotable to a locking position where it is generally transversely disposed relative to the shaft of the bolt. More particularly this invention relates to a blind hole bolt which may be used in a blind hole or a reamed hole which requires a strong and tight fit but in which one side is inaccessible or is extremely difficult to obtain access to. More specifically this invention relates to a locking blade contained in a slot in one end of said blind hole bolt which pivots from an inoperative position axially aligned with the shaft of said bolt to a locking position and axially travels along the length of the slot in pivoting from one position to the other. Therefore, when the locking blade is in the locked position it is in abutment with a welded stop across the end of the slot.

DESCRIPTION OF THE PRIOR ART

There have been many proposals as to the use of a locking blade disposed in a slot which can be used in an inaccessible place. Examples of such bolts are disclosed by Grubb, et al. in U.S. Pat. No. 513,132, Lockwood in U.S. Pat. No. 196,914, Peterson in U.S. Pat. No. 624,969, Burridge in U.S. Pat. No. 1,075,759, Pataky in U.S. Pat. No. 1,516,347, Smith in U.S. Pat. No. 2,124,658 and Ames in U.S. Pat. No. 2,997,909. All of these patentees have proposed the use of pins which serve as a pivot means for the locking blade. In most cases the pin was the limiting factor as to the strength of the bolt since if the pin were to shear off the locking blade would fall out of the slot. This was not the case in Peterson and in Burridge, both of whom utilized a more complex mortised slot or opening for the provision of the locking blade. Only Burridge, however, recognized that to make use of the strength of the closed end of the bolt, it was necessary for the blade to move axially as well as pivotably. Burridge accomplished this by provision of a pin 13 which fit into an elongated slot 11. Burridge realized, of course, that the provision of the slot 11 in addition to slot 10 weakened the shaft of the bolt and for this reason utilized an extremely small pin 13 in an extremely narrow slot 11.

Chester in U.S. Pat. No. 3,521,519 provided a guiding channel or groove inside of the slot and utilized a ball bearing 17 as the pivot point for the locking blade 15. However, the only strength provided by Chester to prevent the blade and the ball bearing from falling out of the slot was provided by staking the end of the bolt at points 23 and 24 to immobilize the ball within the slot.

SUMMARY OF THE INVENTION

According to the present invention strength is provided in the blind hole bolt by the utilization of a locking blade stop or other strength closures welded into position at the end of the slot. The locking blade is allowed to travel axially as it pivots from the first position to the second locking position so that in the second position the bottom of the locking blade is in abutment with the welded stop and derives considerable strength from this supporting position. Since the blind hole bolt of my invention is envisioned for use in areas requiring a great amount of strength, such as in building railroad bridges, and in mounting or anchoring machinery to factory floors, a guide ball and pivot means is provided in the locking blade by forming an embossed semicircular guide ball which fits in a guiding channel or groove within the slot. Thus as the locking blade pivots from the inoperative position in alignment with the shaft to the operative position transversely disposed relative to the shaft the blade moves axially guided by the guide ball embossment in the guiding channel and the bottom of the blade 15 is supported by the top of the welded locking blade stop.

BRIEF DESCRIPTION OF THE DRAWINGS

FIG. 1 is a side elevation with parts in section of the bolt of my invention being inserted into a blind hole.

FIG. 2 is a side elevation of a fragment of the bolt illustrating in dotted lines the locking blade in inoperative position in alignment with the shaft and illustrating in full lines the axial movement and pivotable movement of the guide ball and locking blade in moving to locking position.

FIG. 3 is a side elevation illustrating the locking blade in locked position.

DETAILED DESCRIPTION OF THE PREFERRED EMBODIMENT

As previously mentioned, a blind hole or reamed hole is defined as a hole in which it is difficult or impossible to gain access to one side thereof and a hole in which a tight fit is desirable. An example of such a hole is in the construction of railroad bridges wherein the bolt is inserted from the top through a beam and it is necessary for a workman to either work on a scaffolding or suspended in a boatswain's chair in order to tighten the nuts on the underside. In many other instances, of course, it is impossible to gain access at all to the other side without tearing out an expensive metal plate or going to considerable trouble and expense.

Figure 4:
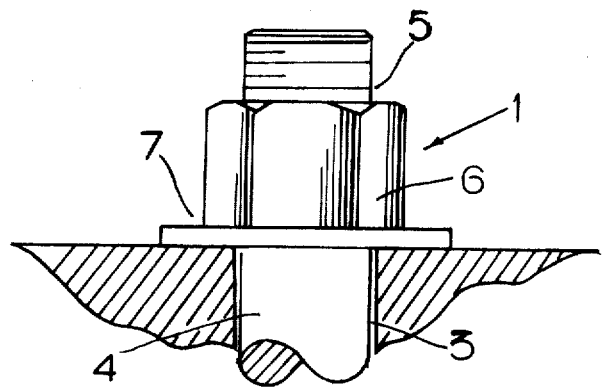
FIG. 4 is a side elevation with parts in section illustrating a modification of the blind hole bolt in locked position.
Figure 4:
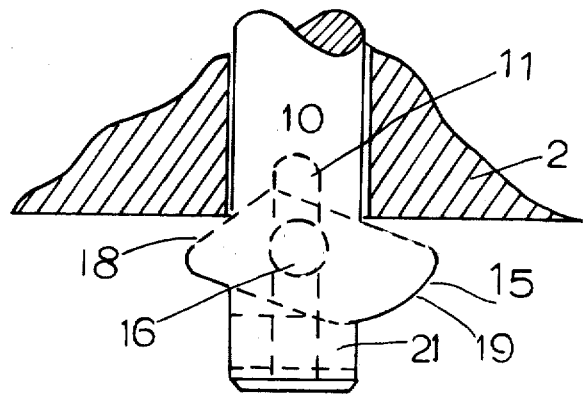
Figure 5:
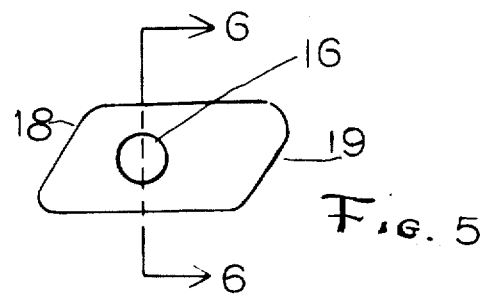
FIG. 5 is an elevational view of the locking blade illustrated in FIG. 4.
Figure 6:
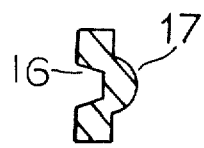
FIG. 6 is a sectional view taken along line 6—6 of FIG. 5 illustrating the guide ball embossment and pivot point of the locking blade.
Figure 7:
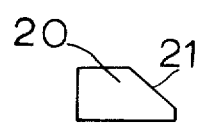
FIG. 7 is a side elevation of the locking blade stop.
Figure 8:
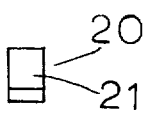
FIG. 8 is an end view of the locking blade stop.

Referring now to the drawings the blind hole bolt 1 of my invention is shown in FIG. 1 being inserted through a beam 2 in the blind hole 3. The shaft 4 is threaded at one end 5 and contains a conventional nut 6 and washer 7. The other end of the shaft 4 contains a slot 10 which contains a guide groove or channel 11. The slot 10 contains an upper taper 12 which complements the upper taper 18 of the locking blade 15. Off center of the locking blade 15 is a depression 16 which forms a circular embossment serving as a pivot point and guide ball 17 on the other side. The circular embossment 17 slides in the guide groove 11 so as to allow for axial movement and pivotable movement illustrated in FIG. 2. The locking blade stop 20 is welded into position in slot 10, by means of two strength welds, i.e., fillet weld 50 across the bottom of the slot 10 and fillet weld 51 along the sides of stop 20. (see FIGS. 1 and 2). The welded locking blade stop is tapered at point 21 so as to complement the complementary taper 19 of the locking blade 15. As will be seen in FIG. 1 the locking blade 15 is axially aligned with the shaft 4 of the blind hole bolt as the bolt is inserted through the blind hole 3. However, in FIG. 2 as the blade begins to pivot there is an axial movement down the guiding channel 11 until the locking blade 15 is turned a full 90° as shown in FIG. 3. As illustrated, the lower surface of the locking blade 15 is in abutment with the upper surface of the welded stop 20. A modification illustrated in FIG. 4 shows that in locked position the locking blade 20 does not turn a full 90° but is disposed generally transversely but somewhat diagonally. The lower surface of the locking blade 15 is still in abutting and supporting relation with the upper surface of the welded locking blade stop 20. The upper taper 12 of the slot 10 as well as the taper 21 of the welded stop prevents the locking blade from pivoting other than in a counterclockwise direction. Further, since the pivot point formed by the circular embossment 17 is off center of the locking blade 15, the blade pivots readily and slides axially along the guiding channel 11.

Figure 9:
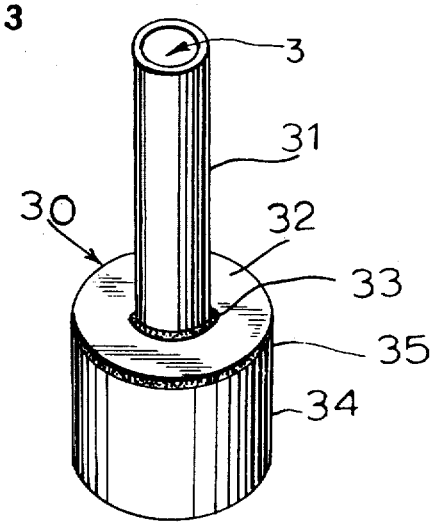
FIG. 9 is a perspective view illustrating a blind hole element utilized in anchoring machinery to factory floors.
Figure 10:
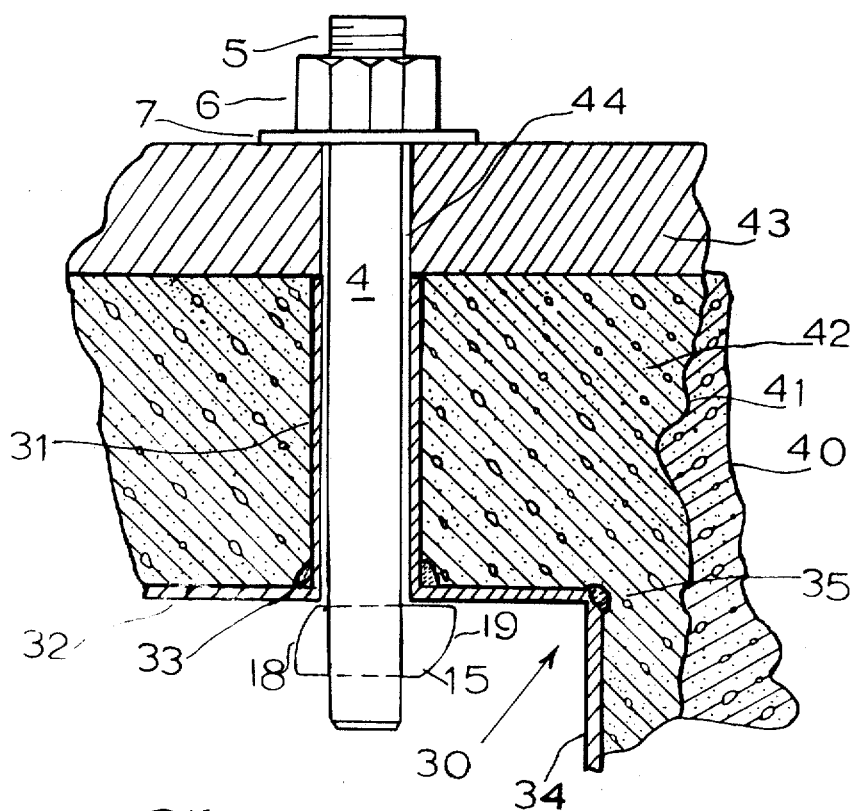
FIG. 10 is a sectional view illustrating a blind hole bolt in operative relation with a blind hole element and anchoring a machinery foot to a factory floor.

A blind hole element 30 illustrated in FIGS. 9 and 10 is provided for purposes of anchoring items such as heavy machinery to surfaces such as factory floors. As is well known, bolting machinery to factory floors is fairly complex in that the bolts are normally set in concrete. It is therefore necessary to suspend the heavy machinery over the bolts by use of a heavy crane and, to carefully guide the machinery feet down over the projecting bolts.

By use of the blind bolt of my invention along with the blind hole element 30 illustrated in FIGS. 9 and 10, it is possible to slide the machinery over holes in the floor and drop the blind holes bolts into position and tighten them down by normal means.

Such a blind hole element 30 consists of three basic parts. A small diameter pipe 31, a flat washer 32, and a large diameter pipe 34. Large pipe 34 is welded by weldment 35 to a flat washer 32 which is in alignment with the end of a relatively small diameter pipe 31. The small diameter pipe 31 making up the blind hole is welded by weldment 33 to the flat washer 32. Now in order to utilize the blind hole element 30, a hole 41 is drilled into the cement floor of the factory building and the blind hole element 30 is dropped into the hole so that the top of pipe 31 is flush with the cement floor 40. New concrete 42 is poured around the blind hole element 30 to a level flush with the top of the small diameter pipe 31. Then a machinery foot is merely pushed over the top of the small diameter pipe 31 forming the blind hole until the bolt hole 44 in the foot is in alignment with the interior bore of small pipe 31. Thereafter, the bolt 1 is dropped into position until the locking blade pivots and moves axially in the slot as previously described and a washer 7 and nut 6 are tightened on to the bolt. Depending on the length of the large diameter pipe 34, if it is necessary to move the machinery at a later date all that is necessary is to remove the nut 6 and washer 7 to allow the bolt to fall into the hole. When it is required to reset another piece of machinery, the bolt can be pulled up through the bolt hole 44 of the machinery foot 43 by means of a magnet. Alternately, the shaft 4 of the bolt can be burned off with an acetylene torch.

Many modifications will occur to those skilled in the art from the detailed description hereinabove given and such description is meant to be non limiting except so as to be commensurate in scope with the appended claims.

I claim:

1. A blind hole bolt comprising in combination, an elongated shaft, threads at one end of said shaft, a diametrically disposed slot extending axially from the other end of said shaft along a portion of said shaft, a solid locking blade, pivotable means for mounting said locking blade in said slot for movement between a first position in which said blade is contained within said slot and is axially aligned with said shaft and a second position in which said blade extends outside of said shaft and is generally transversely aligned relative to said shaft;

A. the improvement in said pivotable means comprising:
    1. a guide channel generally semi-circular in cross section and axially aligned with said shaft in said slot;
    2. a hemispherical guide and pivot means projecting from the side of said locking blade, said hemispherical guide and pivot means being complementary to said channel in cross section for slidably fitting in said guide channel and for moving axially in said channel as said blade pivotably moves from one position to another; and,
  B. the further combination therewith of a locking blade stop comprising a strength closure of said slot at the end of said shaft, said locking blade stop comprising an integral mass of metal fused to the sides and across the bottom of said slot and tapered at one end, at the top to complement the surfae of said locking blade, and serving as a means for limiting the axial movement of said locking blade within said slot and as an abutment means of high tensile strength for said locking blade when said locking blade is in locking position in transverse alignment at the end of said shaft.

2. A blind hole bolt, as defined in claim 1, in which said guide and pivot means is an embossment in the body of said locking blade.

3. A blind hole bolt, as defined in claim 1, in which said strength closure comprises filet welds along the sides and bottom of said locking blade stop.

* * * * *